United States Patent [19]
Pomplun et al.

[11] Patent Number: 5,902,361
[45] Date of Patent: May 11, 1999

[54] FILTER DEVICE FOR FILTERING A FLUID

[75] Inventors: Klaus Pomplun; Roland Beck, both of St. Paul, Minn.

[73] Assignee: Minnesota Mining and Manufacturing Co., St. Paul, Minn.

[21] Appl. No.: 08/955,697

[22] Filed: Oct. 22, 1997

[30] Foreign Application Priority Data

Oct. 24, 1996 [DE] Germany ............................ 196 44 214

[51] Int. Cl.⁶ .................................................. B01D 46/00
[52] U.S. Cl. ............................ 55/385.3; 55/502; 55/509; 55/DIG. 28; 55/DIG. 30
[58] Field of Search ................................... 55/385.3, 502, 55/509, DIG. 28, DIG. 30

[56] References Cited

U.S. PATENT DOCUMENTS

| | | | |
|---|---|---|---|
| 5,472,379 | 12/1995 | Andress et al. | 55/502 |
| 5,554,205 | 9/1996 | Ernst et al. | |
| 5,620,505 | 4/1997 | Rochet et al. | 55/509 |
| 5,639,287 | 6/1997 | Van De Graaf et al. | 55/385.3 |
| 5,720,790 | 2/1998 | Kometani et al. | 55/502 |
| 5,755,844 | 5/1998 | Arai et al. | 55/502 |
| 5,792,229 | 8/1998 | Sassa et al. | 55/502 |

FOREIGN PATENT DOCUMENTS

| | | |
|---|---|---|
| 0 380 026 A1 | 8/1990 | European Pat. Off. |
| 0 620 133 A1 | 10/1994 | European Pat. Off. |
| 0 639 474 A1 | 2/1995 | European Pat. Off. |
| 24 29 474 | 6/1974 | Germany |
| 29 00 035 | 1/1979 | Germany |
| 33 39 225 C2 | 10/1984 | Germany |
| 34 39 255 A1 | 10/1984 | Germany |
| 38 22 155 A1 | 6/1988 | Germany |
| 59-85472 | 5/1984 | Japan |

*Primary Examiner*—Jay H. Woo
*Assistant Examiner*—Minh-Chau T. Pham
*Attorney, Agent, or Firm*—Gary Griswold; Robert W. Sprague; William J. Bond

[57] ABSTRACT

A filter device for filtering a fluid, in particular for filtering the air flowing into the passenger compartment of a vehicle. The filter element (10; 60) including filter material (12; 62) with a border (14; 64) and a filter element frame (20; 70) connected with the filter material (12; 62) and extending at least partly along the border (14; 64), the filter element frame (20; 70) being provided with a projecting resilient sealing lip (24; 74) for abutting a device (42, 44, 48) receiving the filter element (10; 60), the sealing lip (24; 74) having at least one bending section (26) of a first thickness (30) facing the filter element frame (20; 70) and at least one enlarged section (28) adjoining the at least one bending section (26) and facing away from the filter material (12; 62), at least a part (40) of the enlarged section being of a second thickness (32) greater than the first thickness (30) in the at least one bending section (26).

12 Claims, 3 Drawing Sheets

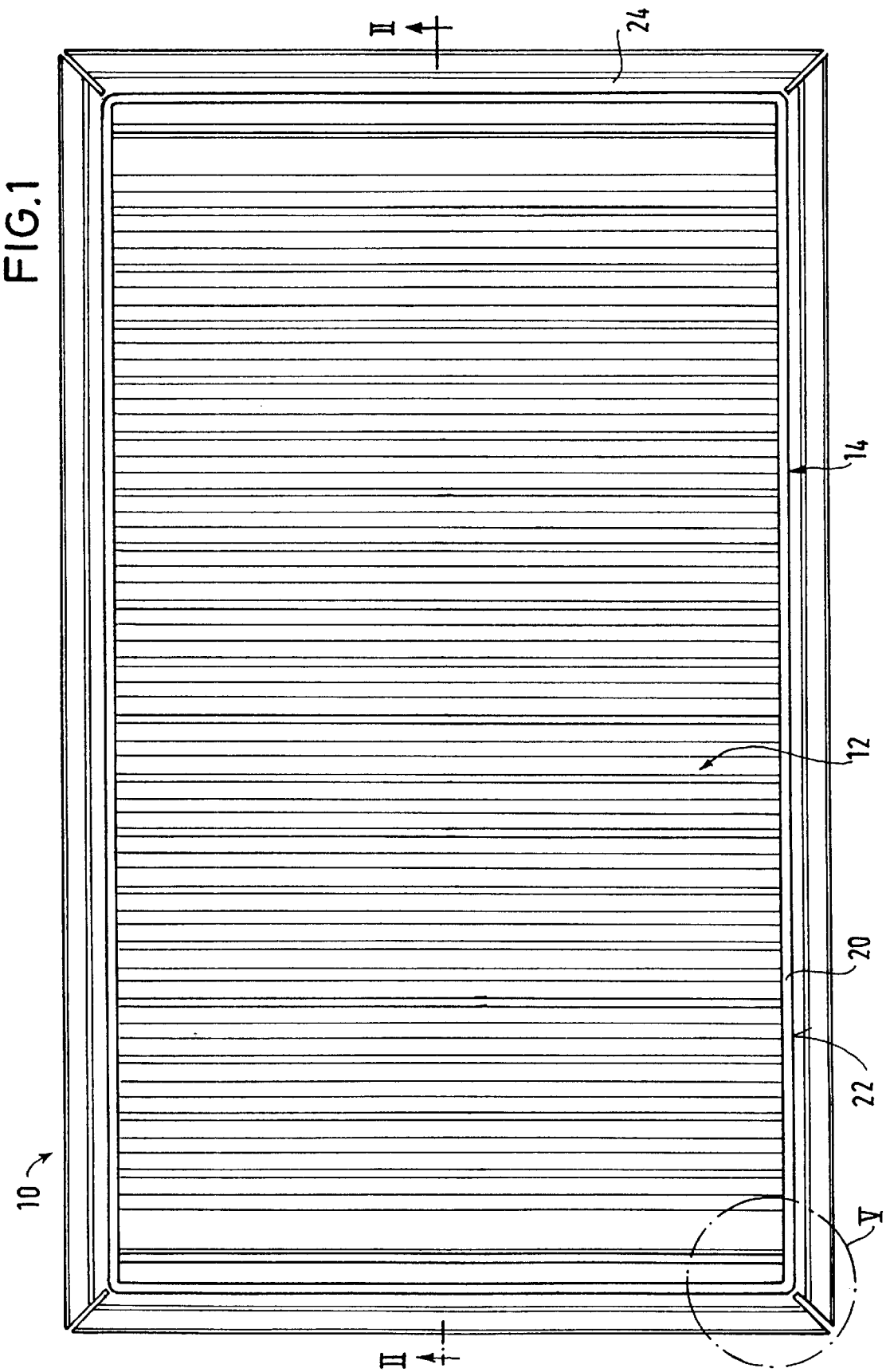

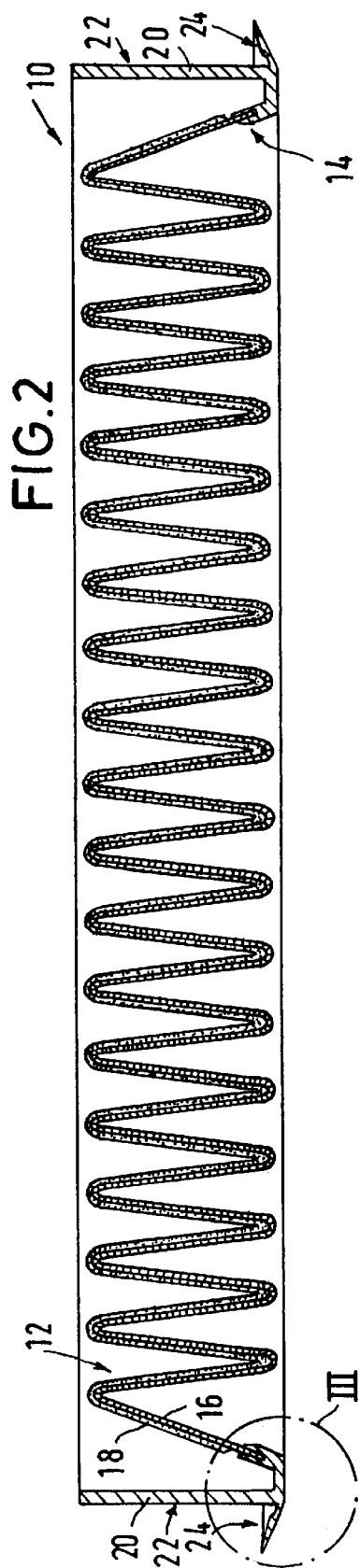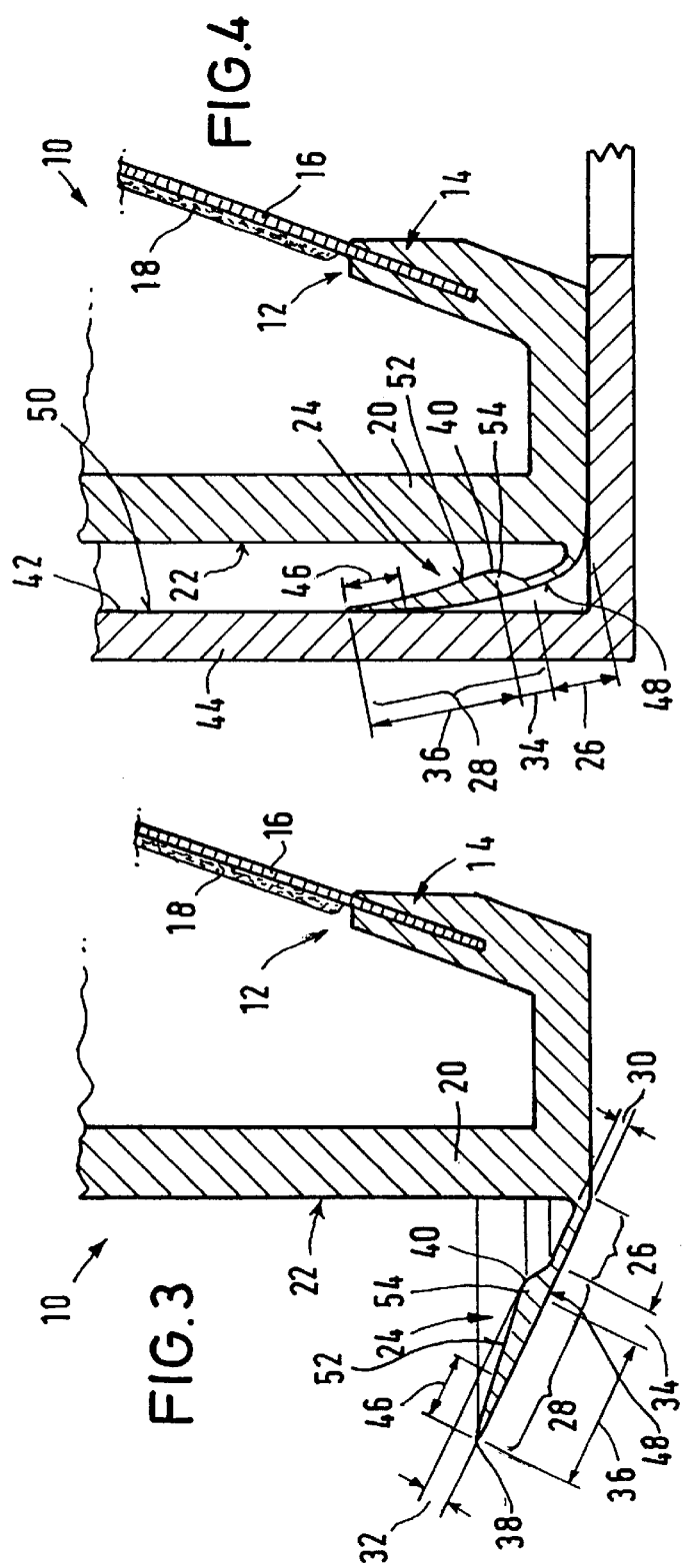

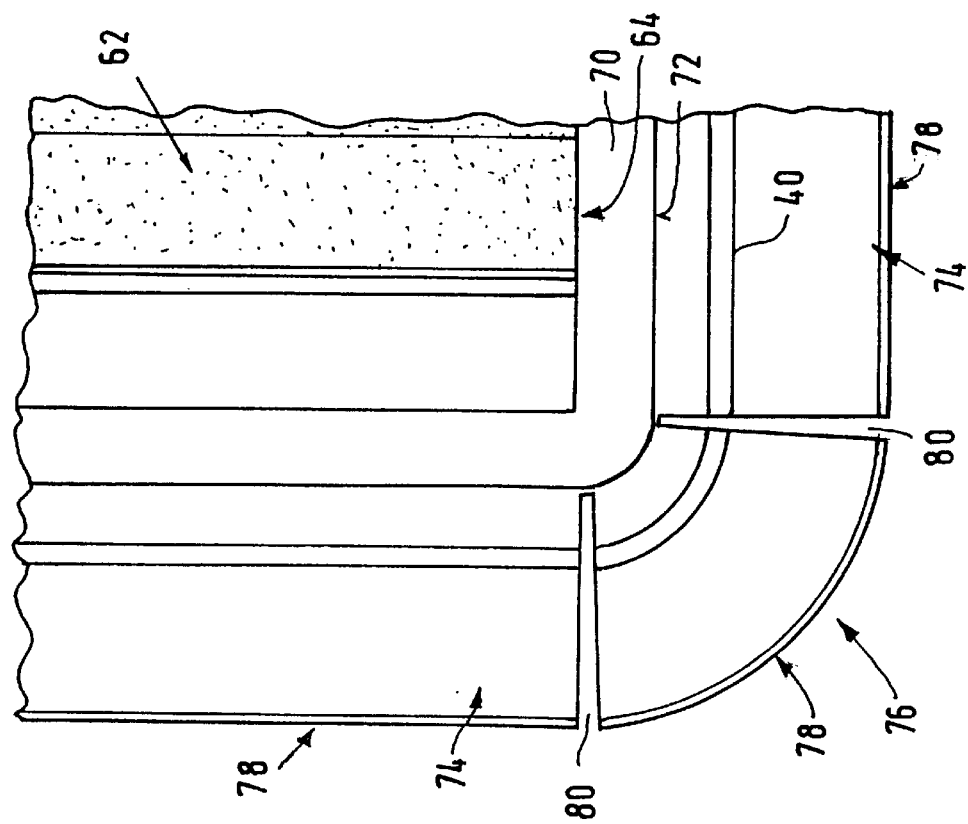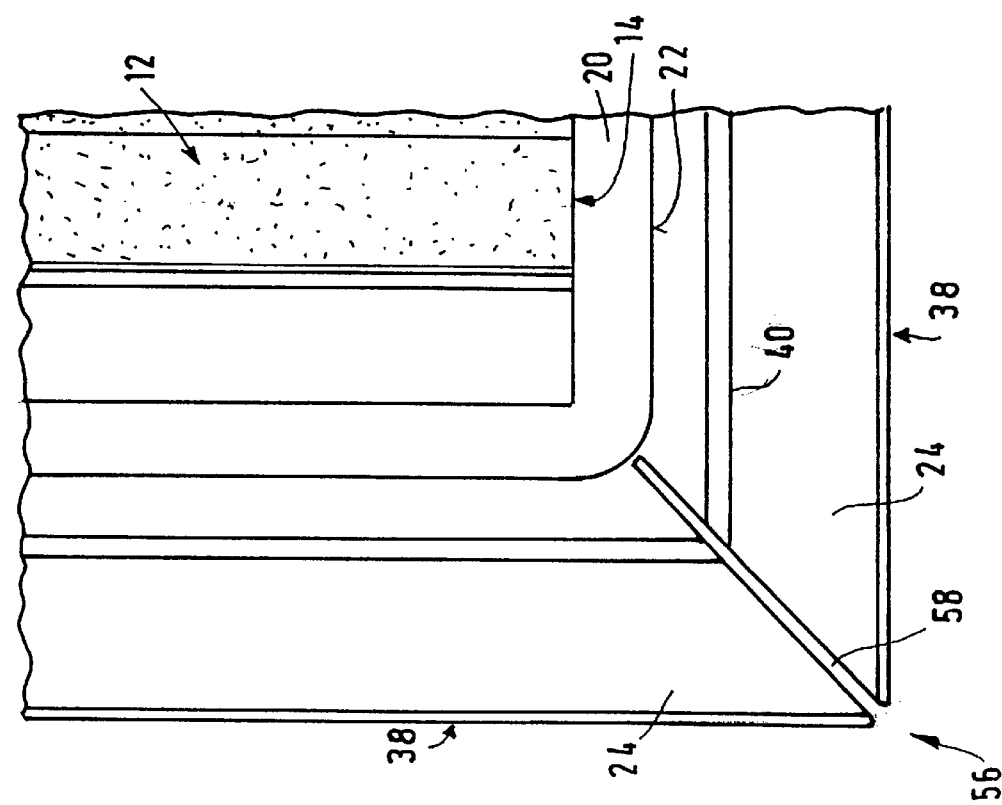

FILTER DEVICE FOR FILTERING A FLUID

FIELD OF THE INVENTION

The invention refers to a filter device for filtering a fluid, this fluid being, in particular, the air flowing into the passenger compartment of a vehicle.

BACKGROUND OF THE INVENTION

Filter devices for filtering a fluid, in particular the air flowing into the passenger compartment of a vehicle, are known in a great number of designs. Generally, the filter device includes a filter element provided with a filter material limited by a border with which a filter element frame is connected. The filter element frame extends at least partly along the border of the filter material. Feasibly, the filter material (in particular a filter paper or a nonwoven filter material) is pleated in zigzag shape so as to increase the filter surface exposed to the fluid flow. In most cases, the filter element frame is disposed extending around the periphery of the filter material; however, with a filter material pleated in zigzag shape it sometimes suffices to make the filter frame extend only along the pleated lateral edges of the filter material. For example, such filter elements are inserted into the fluid inlet opening of a device through which filtered fluid will flow subsequently. In order to prevent fluid flow between the filter element and the edge delimiting the inlet opening of the device, a sealing profile is applied in this area, the profile being a strip generally made of an elastic material, e.g., rubber or foamed material. With a view to the manufacture of the filter element, it is feasible to provide this sealing profile integrally with the filter element.

From German Patent 34 39 255, a filter element is known that has a pleated filter material surrounded by a peripherally extending filter element frame of cardboard material. This filter element frame comprises protruding tongues bent towards the outer side of the filter element frame facing away from the filter material. These cardboard tongues projecting under an acute angle serve as sealing lips resiliently abutting, from inside, the edge of an inlet opening receiving the filter element.

From German Patent 24 29 474, a filter element is known wherein the filter element frame surrounding the filter material is made of a plastics material and has a sealing lip integrally formed thereto which comprises a bending section adjoining the filter element frame and an end portion adjoining the bending section. With a filter element inserted into a filter housing or the like device, the sealing lip is bent in the region of its bending section, whereas it abuts the filter housing in the region of its end portion.

European Patent 0 620 133, European Patent 0 639 474 and Japanese Patent 59-85472 disclose filter elements, wherein the filter element frame enclosing the filter element is provided with an added separate elastic sealing strip.

Finally, European Patent 0 380 026 describes a filter element, wherein a flat filter in the shape of a filter material web is inserted laterally into slots provided in a housing receiving the filter element. The sealing between the filter element and the receiving housing is achieved in particular by the labyrinth-like design of the area between the edges of the filter element and the slots in the receiving housing, which causes a multiple deflection of the fluid flow, thereby resulting in a sealing effect.

For reasons of cost, manufacturers are intent on providing the filter element as a plastic part. Most of the plastic materials used today that can be produced and processed at low cost, however, have a comparatively great thermal expansion factor and manufacture-related deviations in measurements, which is why in particular large sized filter elements must be insertable into the receiving housings with a corresponding play. In order to achieve a sufficient sealing between the filter frame and the receiving housing under the temperature conditions to be expected, the sealing strips has to be formed accordingly. For reasons of manufacturing techniques, the filter elements should be provided with integral sealing lips projecting from their filter element frame, whereby the sealing lips should have thickness so as to always abut the receiving housing. To maintain the elasticity of the sealing lips when the filter element is inserted into the receiving housing, they must not be bent beyond their yielding point in the bending section. With sealing lips of plastic material this means that the sealing lips have to be relatively thin. Yet, this is disadvantageous in the manufacturing process, since the injection mold cavities used in making the plastic filter element frame create a comparatively strong (flow) resistance in the area of the thin sealing lip. This requires increased material pressures and causes greater loads on the injection mold and the molded part, in particular when viscose materials such as polypropylene are used, which has proved advantageous as a material for filter devices of the type referred to above.

It is the object of the invention to provide a filter device that can be produced at low cost and which provides for a reliable sealing of the filter element frame in the housing receiving the same.

BRIEF SUMMARY OF THE INVENTION

The invention provides a filter device provided with a filter element comprising a filter element frame and a filter material with a border. The filter element frame is connected with the filter material and extends at least partly along the border of the filter material. The filter element frame is provided with a projecting resilient sealing lip for abutting a device receiving the filter element, the sealing lip has at least one bending section of a first thickness facing the filter element frame and at least one enlarged section adjoining the at least one bending section and facing away from the filter element. At least a part of the enlarged section is of a second thickness greater than the first thickness in the at least one bending section.

The sealing lip of the filter element frame has at least one bending section and at least one enlarged section. The bending section faces the filter element frame, while the enlarged position adjoining the bending section is averted from the filter element frame. At least a part of the enlarged section thickness is greater than that of the bending section. The sealing lip may have one or a plurality of such pairs of sections, each comprising a bending section and an adjoining enlarged section. Should the sealing lip have a plurality of such pairs of portions, the bending sections and the enlarged sections are arranged in alternating succession.

The sealing lip is elastically deformable in its bending section(s) when, upon inserting the filter element into a receiving housing or another device of the kind, the sealing lip comes into abutment with the same. In order to prevent the material of the sealing lip at the bending section(s) from being deformed beyond the yield limit, thereby being deformed plastically, the bending section should be of an appropriate length or be provided with a corresponding number of shorter bending sections and intermediate enlarged sections. As mentioned above, when manufacturing a filter element frame with a uniform integral sealing lip as an injection molded plastic part, there arises the problem that the plastic material does not entirely fill the narrow space forming the sealing lip, or will do so only when the injection pressure of the plastic material is increased. In this respect, the present invention remedies the problem by making only a part of the extension of the sealing lip sufficiently thin for a resilient bending of the sealing lip. In the other parts, the sealing lip has a greater thickness; these parts correspond to the enlarged section(s). Thus, in the injection mold, the cavity provided for forming the sealing lip has one or more thin constrictions only in parts thereof, the constrictions forming the bending section(s). In the remaining parts, the cavity is larger, which is why the plastic material can be readily filled without having to use an excessively high injection pressure so that no increased load on the injection mold and the molded part is expected.

Thus, the invention provides for a filter device, the filter element of which may be provided with a relatively long sealing lip that is resiliently deformable at least in parts thereof and may be produced by injection molding together with the filter element frame as an integral part thereof. In particular, plastic materials of relatively high viscosity may be employed, such as polypropylene. For large sized filter elements, it is a particular advantage to be able to produce relatively long projecting sealing lips, since, due to possible temperature variations and manufacture tolerances, they can be inserted into receiving slots, or like devices, of units to be supplied with filtered fluid with a comparatively large play without leakages between the filter element and the receiving device occurring over the respective temperature range. Further, manufacturing tolerance requirements may be lowered, which also has cost reduction effects on the production, since the manufacturing process does not have to use such strict tolerances.

In an advantageous embodiment of the invention, it is provided that each enlarged section has an adjoining portion and an end portion. The adjoining portion faces the filter element frame and is adjacent to the bending section. Accordingly, the end portion extends away from the filter element frame up to the free end of the enlarged section or to the next bending section, if several pairs of bending and enlarged portions are provided. In the adjoining portion, the thickness of the enlarged section increases, in particular linearly, whereas the thickness of the sealing lip decreases in the end portion of the enlarged section.

Preferably, the end portion and the adjoining portion adjoin each other. Alternatively, it could be provided that an intermediate portion is disposed between these two portions, in which the thickness of the sealing lip is constant.

Suitably, the end portion of an enlarged section of the sealing lip extends over a greater length than the adjoining portion. Preferably, the length of the end portion is two to four times the length of the adjoining portion.

In the direction of its thickness, the sealing lip is defined by an upper and a lower surface. Feasibly, the lower surface is smooth, while the upper surface has a profile whereby the different sections or the different portions of the sections are formed.

Suitably, the end of the sealing lip facing away from the filter element frame is tapered in its thickness. In particular, this end is part of the end portion of the enlarged section farthest away from the filter element frame.

It is a further advantage of the invention that, due to the structural resilience of the sealing lip in the bending section thereof, the same plastic material may be used for the sealing lip and the filter element frame. In particular, this material is a polypropylene, polyethylene or another polyolefin material. Preferably, also the filter material consists of the same material as the filter frame and the sealing lip. Specifically, the filter material is a non-woven fabric of microfibers that are adhered, welded or (mechanically) engaged among each other, the non-woven being connected with a reticular support structure also of polyolefin material. Thus, the invention makes a substantial contribution to a simple recyclability of filter devices, since the filter device itself is of only one type, i.e. it may be made from one and the same material.

The following is a detailed description of an embodiment of the present invention, taking in conjunction with the accompanying drawings. In the Figures.

BRIEF DESCRIPTION OF THE DRAWINGS

FIG. 1 is a filter element with a pleated filter material and a circumferential filter element frame with a circumferential projecting integral sealing lip;

FIG. 2 is a section through the filter element along line II—II in FIG. 1;

FIG. 3 is an enlarged view of the area III in FIG. 2;

FIG. 4 is a view corresponding to FIG. 3, however illustrating the filter element inserted into the opening of a housing receiving the filter element;

FIG. 5 is an enlarged view of the area V in FIG. 1, and

FIG. 6 is an enlarged view corresponding to V in FIG. 1, however, illustrating a filter element according to an alternative embodiment having a sealing lip with a different design in the corner area.

DETAILED DESCRIPTION OF THE PREFERRED EMBODIMENT

FIG. 1 is a plan view of the filter element 10 according to a first embodiment of the invention. For example this filter element 10 serves to filter the air streaming into the passenger cabin of a motor vehicle. This air stream is maintained by a device provided to this purpose, e.g. a blower or the like adapted for blowing or sucking air through the filter element. The term "means" has a rather general meaning in the context of this invention; it is meant to comprise all devices and circumstances providing for a (fluid) flow passing through the filter element. Ultimately, in a vehicle provided with the above filter element 10 and regardless of whether it is equipped with a blower or not, such a means can also be the vehicle itself because the vehicle generates an airflow while being driven, with the airflow streaming through the filter element of the filter means. The filter element 10 has a pleated filter material 12 with a rectangularly extending border 14. As illustrated in particular in FIG. 2, the filter material is comprised of a plastic supporting scrim 16 with a non-woven filter material 18 applied thereon. A rectangular filter element frame 20 formed as a strip extends around the filter material 12. On the outer side 22 of the frame facing away from the filter material 12, the filter element frame 20 is provided with a circumferentially extending sealing lip 24. The shape of the sealing lip 24, as well as its function for sealing the filter element 10 when, for example, the same is inserted into the air inlet opening of a unit to be supplied with filtered air, e.g. the air inlet duct of the passenger compartment in a vehicle, will be described below in connection with FIGS. 3 and 4.

The filter element 10 is made as an injection molded part and consists of a polymer material, in particular of polypropylene, polyethylene or other polyolefins. The production of the filter element 10 is carried out in an insert molding process. In this process, the filter material 12 is held clamped in the injection mold, being left free in the border zone. This free border 14 protrudes into that cavity of the mold that forms the filter element frame 20. Connected to this mold cavity is the mold cavity forming the sealing lip 24. Upon the injection of plastic material, the free border 14 of the filter material 12 is molded around, thereby obtaining the connection between the filter element frame 20 and the filter material 12. The injection mold is preheated to a temperature far below the temperature of the injected polymer material so that the injection mold also serves to cool the injected material faster.

As already explained above, the filter element consists, in particular, of polypropylene. This means that the filter element frame 20 with the sealing lip 24, the supporting scrim 16 and the fibers of the non-woven filter material 18 are each of polypropylene. This material is of general usefulness in this respect, due to its being comparatively easy to work into molded parts. Moreover, the temperatures to be expected in a vehicle and to which the individual components of the ventilation system are subjected are well below the softening temperature range of polypropylene. Besides, polypropylene is a comparatively low-cost material and is recyclable.

Referring now to FIGS. 3 and 4, the structure and the function of the sealing lip will be described.

The sealing lip 24 has different sections 26, 28 starting from the filter element frame 20. The section 26 immediately adjoining the filter element frame 20 is a bending section where the sealing lip 24 has a reduced thickness 30. This thickness 30 is selected such that the sealing lip 24 may be deformed elastically in its bending section 26. The lower limit of the thickness 30 is defined by the fact that the sealing lip 24 should be sufficiently resilient in its bending section 26 after deformation so that it abuts a filter element housing or a similar device with sufficient abutment force (see FIG. 4). The upper limit of the thickness 30 is determined by the fact that the sealing lip 24 should be deformable in the bending section 26 such that the filter element 10 can be inserted into the filter element housing. Generally, the thickness 30 of the bending section 26 should have a value between 0.20 mm and 0.40 mm and, preferably, between 0.25 mm and 0.30 mm.

Joining the bending section 26 is the section 28 which is an enlarged section where the thickness 32 of the sealing lip 20 is greater than the thickness 30 in the bending section 26. Suitably, the thickness 32 is about twice to five times, and in particular about three times, the thickness 30. The enlarged section 28 itself is divided into an adjoining portion 34 and an end portion 36 adjoining the adjoining portion 34. In the adjoining portion 34, the thickness of the enlarged section 28 increases, preferably linearly, from the value of the thickness 30 of the bending section 26 to the value of the thickness 32, the transitions being rounded. In the area of maximum thickness 32, the adjoining portion 34 is followed by the end portion 36, in the course of which the thickness of the enlarged section 28 decreases from the value of the thickness 32 to zero. In the end section 36, as shown in FIG. 3, the sealing lip 24 tapers towards the free end 38 of the sealing lip 24 to about the thickness that it has in the bending section 26. In this manner, a vertex or, more precisely, a "vertex line" 40 is obtained in the enlarged section 28, from which vertex the thickness of the enlarged section 28 decreases substantially linearly towards both sides of the vertex line 40.

It holds for the length of the bending section 26 and the enlarged section 28, i.e. for the extension of these two sections oriented with the extension of the sealing lip 24 away from the filter element frame 20 that the enlarged section 28 is about one to five times the length, and preferably three times, the length of the bending section 26. Within the enlarged section 28, the end portion 36 is about one to five times, and preferably four times, the length of the adjoining portion 34.

As can be seen in FIG. 4, the sealing lip 24 bends particularly in the area of the bending section 26 when the filter element 10 is inserted into the inlet opening 42 of a receiving housing indicated at 44. In the enlarged section 28, the sealing lip 24 extends substantially straight, there also is some deformation of the sealing lip 24 in the part 46 of the end portion 36 that is adjacent the free end 38. In this part 46, the planar outward facing lower surface 48 of the sealing lip 24 abuts the surface 50 defining the inlet opening 42 of the receiving housing 44. While the lower surface 48 of the sealing lip 24 faces away from the filter element frame 20, the inward-facing upper surface 52 of the sealing lip 24 faces towards the filter element frame 20. The upper surface 52 has a triangular raised part 54 that determines the enlarged section 28.

As indicated in FIG. 5, the sealing lip 24 is slit in the corner area 56. The corner areas 56 of the sealing lip 24 are provided with a slit 58 at an angle of 45° and extending from the free end 38 of the sealing lip 24 up to the filter element frame 20, allowing the sealing lips 24, which extend at right angles with respect to each other, to be deformed freely also in the corner areas 56 and avoiding stuffing in these corner areas 56 when the filter element 10 is inserted into the inlet opening 42 of the receiving housing 44. Accordingly, the sealing lip 24 abuts the inner surface 50 of the inlet opening 42 also in the corner areas 56. Thus, a reliable seal is obtained even in the case of an inlet opening 42 of the receiving housing 44 having inner surfaces 50 that extend at right angles with respect to each other.

An alternative design of the corner area of the sealing lip in a second embodiment of the filter element, is illustrated in FIG. 6. The filter element 60 of FIG. 6 comprises a filter material 62 enclosed by a rectangular filter element frame 70. The outer side 72 of the filter element frame 70, facing away from the filter material 62, is provided with an integral sealing lip 74. The structure and the design of this sealing lip 74 is similar to the sealing lip 24 of the filter element 10 shown in FIGS. 1 to 5.

In the corners 76, the sealing lip 74 extends in a curve 78 of 90°. In the end portion of this curve 78, the sealing lip 74 is provided with two V-shaped slits 80 extending over the entire width of the sealing lip 72. These two slits 80 allow for the deformation of the sealing lips 74 in the corner areas 76 without stuffing. The curve 78 of the free end 38 of the sealing lip 74 guarantees a sealing abutment on the inner surfaces 50 of the inlet opening 42 of the receiving housing 44 when these are rounded in the corner areas.

We claim:

1. A filter device for filtering a fluid, in particular for filtering the air flowing into the passenger compartment of a vehicle, comprising a filter element comprising a filter material with a border and a thermoplastic filter element frame formed of a plastic material connected to the filter material and extending at least partly along the filter material border, the filter element frame being provided with a projecting resilient sealing lip for abutting a device receiving the filter element, the sealing lip having at least one bending section of a first thickness facing the filter element frame and at least one enlarged section adjoining the at least one bending section and facing away from the filter element frame, at least a part of the enlarged section being of a second thickness greater than the first thickness in the at least one bending section.

2. The filter device of claim 1, wherein the thickness of the sealing lip enlarged section increases in an adjoining portion of the enlarged section adjacent the bending section and decreases in an end portion of the enlarged section averted from the bending section.

3. The filter device of claim 2, wherein the increase in thickness in the adjoining portion or the decrease in thickness in the end portion are linear.

4. The filter device of claim 2, wherein the end portion is adjacent the adjoining portion.

5. The filter device of claim 2, wherein the end portion is larger in extension than the adjoining portion.

6. The filter device of claim 5, wherein the extension of the end portion is about two to four times the extension of the adjoining portion.

7. The filter device of claim 1, wherein the second thickness is about two to five times the first thickness.

8. The filter device of claim 7, wherein the second thickness is about three times the first thickness.

9. The filter device of claim 1, wherein the sealing lip has a planar lower surface and a profiled upper surface.

10. The filter device of claim 1, wherein the sealing lip is formed integrally with the filter element frame, and the sealing lip is disposed on the outer side of the filter element frame that is averted from the filter material.

11. The filter device of claim 1, wherein the sealing lip has a corner portion which extends around a corner of the filter element frame and is tapered, where the sealing lip has a slit in said corner portion, which starts at the end of the sealing lip averted from the filter element frame and ends near the filter element frame.

12. The filter device of claim 1, wherein the sealing lip has a corner portion which extends around a corner of the filter element frame and is round, where the sealing lip has two respective slits on both sides of said round corner portion, which starts at the end of the sealing lip averted from the filter element frame and ends near the filter element frame.

* * * * *

UNITED STATES PATENT AND TRADEMARK OFFICE
CERTIFICATE OF CORRECTION

PATENT NO. : 5,902,361
DATED : May 11, 1999
INVENTOR(S) : Klaus Pomplun and Roland Beck It is certified that error appears in the above-identified patent and that said Letters Patent is hereby corrected as shown below:

Column 1,
Line 44, please delete "plastics" and insert -- plastic --.

Column 4,
Line 13, please delete "taking" and insert -- taken --.
Line 37, after the phrase "For example", please insert -- , --.

Signed and Sealed this

Thirtieth Day of July, 2002

Attest:

Attesting Officer

JAMES E. ROGAN
Director of the United States Patent and Trademark Office